Dec. 8, 1970     L. A. STENSTROM     3,545,286

HOLDER WHICH IS DISPLACEABLE ALONG ONE AXIS

Filed June 27, 1968

INVENTOR

LENNART A. STENSTROM

BY

AGENT ated Dec. 8, 1970

United States Patent Office 3,545,286
Patented Dec. 8, 1970

3,545,286
HOLDER WHICH IS DISPLACEABLE ALONG ONE AXIS
Lennart Arvid Stenstrom, Huddinge, Sweden, assignor, by mesne assignments, to U.S. Philips Corporation, New York, N.Y., a corporation of Delaware
Filed June 27, 1968, Ser. No. 740,496
Claims priority, application Sweden, July 7, 1967, 10,387/67
Int. Cl. G01p 15/08
U.S. Cl. 73—517                    3 Claims

ABSTRACT OF THE DISCLOSURE

A support displaceable along one axis and using two end pieces concentric with and perpendicular to an axis and interconnected with symmetrically arranged leaf springs each having a plane radially disposed with respect to the axis. Each end piece is connected to a fundament by means of a group of axially symmetrical straight flexible wires extending non-radially between each end piece and the fundament and lying in a plane parallel to the respective end piece. The group of wires connecting one end piece form angles with radii from the axis which are opposite to the corresponding angles formed by the wires connecting the other end piece. Each wire is prestressed, the energy being stored as a tortional moment in the springs.

---

Figure 1:
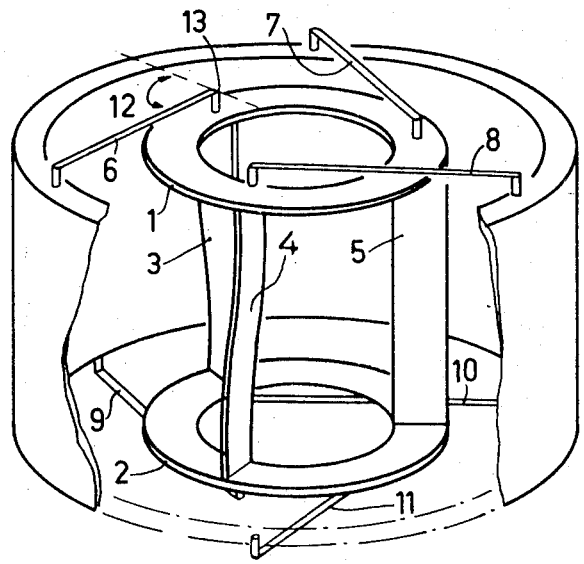

The invention refers to a holder which is displaceable along one axis but locked in remaining degrees of freedom. The holder is in first hand adapted for supporting components as coils, capacitor plates and optical or pneumatic valves, which components may serve as power or position transducers, for example in servosystems.

It refers in particular to a coil holder for an accelerometer, in which the coil is surrounded by a magnetic field wherein means is arranged for sensing the position of the holder in the axial direction and for producing a feed back signal. After amplification is applied to the coil as a measure of the acceleration in a sensing direction coinciding with the motion direction of the coil. Accelerometers of the class which can be obtained in this way are for example used in inertial navigation systems, where specially high requirements exist on accuracy and sensitivity of the accelerometer. The high accuracy shall be maintained at the same time as the accelerometer shall be able to during accelerations of the magnitude 20 g. both in its own sensitive direction and in other directions. In order to maintain the required accuracy it is required that the support of the holder is rigid in a transverse direction so that it will not appreciably vary its position even if maximum transverse acceleration is imparted.

Attempts have been made to support such a holder on one or more diaphragms. Then a device is obtained which is similar to the movable system in loud speakers. Friction and uncalculatable disturbances from temperature changes and mechanical yieldings, however, destroy the precision of such a support. A certain improvement can be achieved by a suitable slitting of the diaphragms. Then, however, the rigidness in transverse direction is decreased, having a disadvantageous effect on the precision of the support.

Another method which gives a moderate spring force and small friction is to support the holder by means of flexible wires arranged in a plane perpendicular to the axis of the coil. With radial orientation of the wires a high lateral stability is achieved, if the wires are kept well stretched. However, if the point of attachment for any of the wires is displaced as a result of temperature changes or mechanical yieldings the strain force in the wires will vary as to size and direction.

The change in direction of the force will involve a tendency to deviate from the neutral or zero position of the holder. A variation in the magnitude of the force will give the same result. Therefore if the wires are oriented somewhat obliquely, the strain force and changes in this force will have a component along the axis of the holder.

The described support therefore has a tendency to be dependent on the temperature and must therefore be regarded as less suitable in instruments having especially high requirements on accuracy, for example accelerometers for inertial navigation. If one tries to reduce the temperature dependence by decreasing the strain force in the wires or by arranging resilient elements in the connections of the same the rigidity of the device in transversal direction is decreased.

By the invention a holder support is obtained having axial movability, which in spite of an appreciable rigidness in the transverse direction is only slightly influenced by thermic or other dimension changes in the holder or in the fundament surrounding the same.

The holder according to the invention is characterized in that it has two end pieces arranged perpendicular to the axis, which end pieces are interconnected through resilient elements and connected to a fundament by means of symmetrically arranged, flexible wires lying within or close to the plane of the end pieces and being oriented such that stretching of the wires will produce torques about the axis with opposite sign at the two end pieces. The wires are kept stretched by means of an elastic prestress in the resilient elements.

By holding the wires stretched by means of an elastic prestress in the resilient elements connecting the two end pieces, the strain force in the wires will not vary appreciably at small displacements of their points of attachment.

Figure 2:
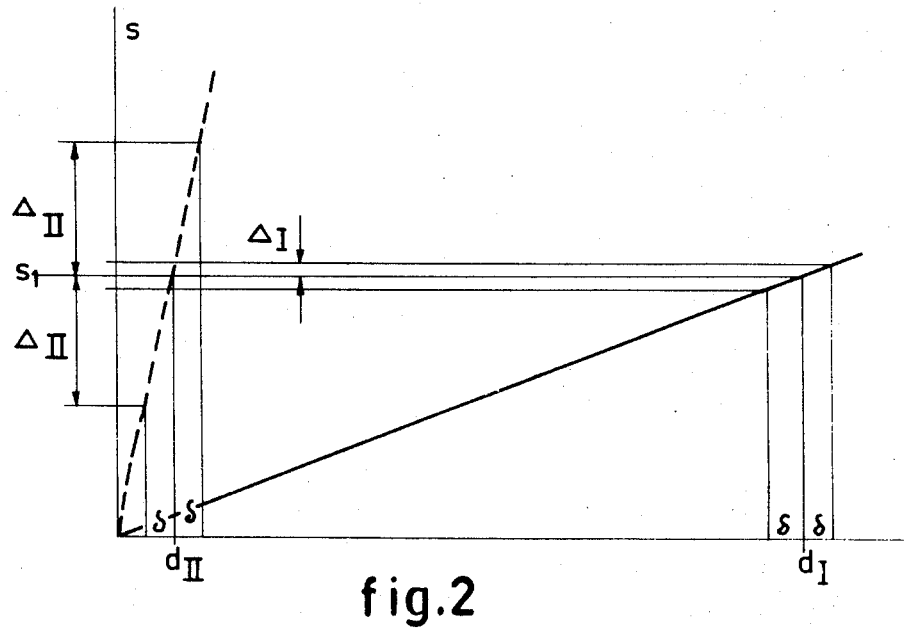

The invention is illustrated in the accompanying drawing, in which:

FIG. 1 shows a schematic perspective view of the holder and support for the same and FIG. 2 shows two comparative curves over the strain force in the supporting wires on the one hand in a holder device according to the invention and on the other hand in a corresponding holder device without resilient elements in the holder.

The holder according to FIG. 1 is shaped and supported in accordance with the principles of the invention. It consists of two end pieces 1 and 2 which are interconnected through three radially arranged leaf springs 3–5. To the end pieces are attached the movable means to be supported, for example coils serving as power generating means or transducers for position or speed. These means are not shown in the figure. Some of them can be arranged on one end piece and some on the other. Thereby symmetry can be obtained which is advantageous in precision instruments. Alternatively all means can be supported by one end piece. The wires can be used to conduct power to or from the transducers or generating means by making the wires of electrically conductive material with insulated points of attachment.

The holder is connected to the base or fundament by means of flexible wires 6–11 which are drawn from points of attachment on the respective end piece of the holder to points of attachment in a surrounding fundament.

The wires are arranged in planes coinciding with the end pieces or in planes parallel hereto and are symmetrically arranged according to FIG. 1. Each wire forms a certain angle 12 with the radius through its point of attachment 13 in the end piece. The strain force in the wires will therefore produce a torque acting upon the two end pieces. FIG. 1 shows a clockwise torque on the lower piece and anticlockwise torque on the upper end piece. These torques are balanced by an elastic prestress in the leaf springs 3–5. These springs will therefore be somewhat deformed. In the figure this deformation has been exaggerated to be visible.

The system of leaf springs can be regarded as forming a torsional system, the torsion torque of which is used to stretch all wires. The strain in the wires is then adjusted such that it corresponds to the inertial force acting upon the holder at maximum acceleration in transversal direction, whereby no wire will slacken at transversal vibration or acceleration. Therefore the holder will have a fixed position in transversal direction relative to its fundament.

Mechanical yieldings caused by shocks or thermal displacement will result in that the strain force in the wires will be changed. This will happen both in the device according to the invention and in a conventional support with wires drawn between a rigid holder and a rigid fundament.

These two arrangements can be compared by means of a diagram according to FIG. 2, which shows the force S in the wires as function of small displacements in length direction of the point of attachment.

The curve drawn in full line refers to a device according to the invention, while the curve drawn in dotted line refers to a device with rigid holder supported by wires. In both cases a certain force $S_1$ is nominally maintained in the wire, which force is so high that no wire will slacken at a certain acceleration, for example 20 g.

This force corresponds in the first case to a comparatively great deformation $d_1$ which is essentially caused by mutual rotational motion between the two end pieces of the holder. In the second case the deformation will be small and is only caused by the extension $d_{11}$ of the wire, which is several hundred times smaller than $d_1$.

A certain displacement $\pm \delta$ of the point of attachment of the wire will given a certain variation of the strain force in the wire. In a device according to the invention this variation $\pm \Delta_1$ will be small. In the case of a rigid holder a several hundred times larger variation $\pm \Delta_1$ of the strain in the wire will be obtained.

If it is assumed that the wires are not lying exactly in a plane perpendicular to the axis of the device, then the variation in strain in the wires will result in a disturbing component along the axis of the device. When used in accelerometers the reduction in the variation of the strain in the wires with dimensional changes, which according to FIG. 2 is brought about by the invention, can be directly utilized and will result in an improved stability of both zero position and scale constant.

Instead of using leaf springs as torsional elements as in the shown example each suitable type of resilient element can be used, which allows rotational motion between the two end pieces. The end pieces may for example be connected through a torsional rod. Besides in accelerometers the holder according to the invention can also be used in gravimeters, seismographs and the like.

What is claimed is:

1. A holder which is displaceable along one axis and has rigidness in remaining directions and which holder is adapted to support at least one transducer, comprising two end pieces arranged perpendicular to the axis, torsional storage elements interconnecting the end pieces and having flexibility parallel to the one axis thereby allowing relative axial motion between the end pieces, a fundament, and a set of symmetrically arranged substantially straight, flexible, non-radial wires lying in a plane parallel to a plane of each of the end pieces and connecting each end piece with the fundament, each of the wires of one set making substantially the same angle with respective radii passing through the point of contact between the wire and the disk, each of the wires of the other set making the negative of the angle of the one set with respect to corresponding radii, whereby stretching of the wires will produce a torque about the axis with opposite sign at the two end pieces and store the torque in the torsional storage elements, and whereby the wires are kept stretched by means of the stored torque.

2. A holder as claimed in claim 1, wherein the torsional storage elements are formed by leaf springs having bending surfaces oriented along equally spaced radii and located equidistant from the axis whereby each spring contributes a tangential force resulting in the storage of torque.

3. A holder as claimed in claim 2 wherein the stretched wires are made of electrically conductive material with insulated points of attachment for providing electrical connections to the transducer.

References Cited

UNITED STATES PATENTS

| 2,751,573 | 6/1956 | Millington | 340—17 |
| 2,753,544 | 7/1956 | Cox et al. | 73—71.2 |

JAMES J. GILL, Primary Examiner

H. GOLDSTEIN, Assistant Examiner

U.S. Cl. X.R.
73—71.2; 267—1